United States Patent
Jung et al.

(10) Patent No.: US 11,058,984 B2
(45) Date of Patent: Jul. 13, 2021

(54) METHOD FOR TREATING SULFUR HEXAFLUORIDE USING RADIATION AND APPARATUS FOR COLLECTING AND TREATING BY-PRODUCTS

(71) Applicant: KOREA ATOMIC ENERGY RESEARCH INSTITUTE, Daejeon (KR)

(72) Inventors: In-Ha Jung, Jeollabuk-do (KR); Jae-Yong Ryu, Gyeonggi-do (KR); Myun-Joo Lee, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 119 days.

(21) Appl. No.: 15/108,754

(22) PCT Filed: Nov. 25, 2014

(86) PCT No.: PCT/KR2014/011366
§ 371 (c)(1),
(2) Date: Jun. 28, 2016

(87) PCT Pub. No.: WO2015/102229
PCT Pub. Date: Jul. 9, 2015

(65) Prior Publication Data
US 2016/0317965 A1 Nov. 3, 2016

(30) Foreign Application Priority Data

Dec. 30, 2013 (KR) ........................ 10-2013-0166859
May 8, 2014 (KR) ........................ 10-2014-0054514

(51) Int. Cl.
*B01D 53/00* (2006.01)
*B01D 53/73* (2006.01)
(Continued)

(52) U.S. Cl.
CPC ......... *B01D 53/007* (2013.01); *B01D 5/0003* (2013.01); *B01D 5/0057* (2013.01);
(Continued)

(58) Field of Classification Search
CPC .. C01D 3/02; C01F 11/22; C01G 1/06; C01B 17/0253; C01B 17/04; C01B 17/453;
(Continued)

(56) References Cited

U.S. PATENT DOCUMENTS

| 2,507,603 A | * | 5/1950 | Killgore | .................... B01J 27/06 |
| | | | | 423/483 |
| 3,711,596 A | * | 1/1973 | Hartig | ..................... C01B 7/191 |
| | | | | 423/336 |

(Continued)

FOREIGN PATENT DOCUMENTS

| JP | 2004174391 A | 6/2004 |
| JP | 2007038145 A | 2/2007 |

(Continued)

OTHER PUBLICATIONS

Malik, Yogender, "Sulfur Hexafluoride—The gas with a double-edged sword", Apr. 2009, 2 pages, taken from https://www.gasworld.com/sulfur-hexafluoride-the-gas-with-a-double-edged-sword/3704.article (Year: 2009).*

(Continued)

*Primary Examiner* — Ngoc-Yen Nguyen
(74) *Attorney, Agent, or Firm* — McCoy Russell LLP

(57) ABSTRACT

Provided are a method for treating sulfur hexafluoride and an apparatus for collecting and treating by-products. The method for treating sulfur hexafluoride, and the apparatus for collecting and treating by-products according to the present invention are a significantly effective method and apparatus capable of safely treating sulfur hexafluoride at low cost.

14 Claims, 5 Drawing Sheets

(51) Int. Cl.
    *C01B 7/19*     (2006.01)
    *B01D 53/18*     (2006.01)
    *C01D 3/02*     (2006.01)
    *B01D 5/00*     (2006.01)
    *B01D 53/14*     (2006.01)
    *B01D 53/68*     (2006.01)
    *C01F 11/22*     (2006.01)
    *B01D 53/48*     (2006.01)
    *B01J 19/08*     (2006.01)
    *C01B 17/45*     (2006.01)
    *B01D 53/32*     (2006.01)
    *B01D 53/96*     (2006.01)
    *B01D 53/76*     (2006.01)
    *C01B 17/02*     (2006.01)
    *C01G 1/06*     (2006.01)
    *C01B 17/04*     (2006.01)

(52) U.S. Cl.
    CPC ....... *B01D 53/002* (2013.01); *B01D 53/1431* (2013.01); *B01D 53/1493* (2013.01); *B01D 53/185* (2013.01); *B01D 53/32* (2013.01); *B01D 53/48* (2013.01); *B01D 53/68* (2013.01); *B01D 53/73* (2013.01); *B01D 53/76* (2013.01); *B01D 53/96* (2013.01); *B01J 19/085* (2013.01); *C01B 7/191* (2013.01); *C01B 7/195* (2013.01); *C01B 17/0253* (2013.01); *C01B 17/04* (2013.01); *C01B 17/453* (2013.01); *C01D 3/02* (2013.01); *C01F 11/22* (2013.01); *C01G 1/06* (2013.01); *B01D 2251/202* (2013.01); *B01D 2251/306* (2013.01); *B01D 2251/404* (2013.01); *B01D 2252/103* (2013.01); *B01D 2257/204* (2013.01); *B01D 2257/30* (2013.01); *B01D 2258/02* (2013.01); *B01D 2259/80* (2013.01); *B01D 2259/812* (2013.01); *B01J 2219/0883* (2013.01); *Y02C 20/30* (2013.01)

(58) Field of Classification Search
    CPC ........ C01B 7/191; C01B 7/195; B01J 19/085; B01J 2219/0883; B01D 2251/202; B01D 2251/306; B01D 2251/404; B01D 2252/103; B01D 2257/204; B01D 2257/30; B01D 2258/02; B01D 2259/80; B01D 2259/812; B01D 53/002; B01D 53/007; B01D 53/1431; B01D 53/1493; B01D 53/185; B01D 53/32; B01D 53/48; B01D 53/68; B01D 53/73; B01D 53/76; B01D 53/96; B01D 5/0003; B01D 5/0057
    See application file for complete search history.

(56) References Cited

U.S. PATENT DOCUMENTS

| | | | | |
|---|---|---|---|---|
| 3,855,399 | A * | 12/1974 | Van Eiji | C01B 7/193 423/335 |
| 3,986,137 | A * | 10/1976 | Ehrlich | H01S 3/095 359/345 |
| 4,615,715 | A * | 10/1986 | Seshamani | B04C 5/085 55/434.4 |
| 5,057,189 | A * | 10/1991 | Apffel | C09C 1/482 202/113 |
| 6,942,841 | B2 * | 9/2005 | Kanno | A62D 3/20 423/235 |
| 2004/0104107 | A1 * | 6/2004 | Mizutani | B01D 3/143 203/12 |
| 2011/0258914 | A1 * | 10/2011 | Banasiak | C10B 49/10 44/307 |

FOREIGN PATENT DOCUMENTS

| | | |
|---|---|---|
| KR | 20080065851 A | 7/2008 |
| KR | 100860835 B1 | 9/2008 |

OTHER PUBLICATIONS

Kim, J. et al., "A Study on Destruction Efficiency and Particulate by-products of Sulfur Hexafluoride (SF6) using High Ionization Energy with Oxygen, Water Vapor and Hydrogen," Journal of Korea Society of Waste Management, vol. 30, No. 8, Dec. 2013, 9 pages. (See English Abstract on p. 1).

Ryu, J. et al. "A Study on Increase of Sulfur Hexafluoride(SF6) Destruction and Removal Efficiency by Conditioning Agent(H2)," Journal of the Environmental Sciences, vol. 21, No. 9, Sep. 2012, 7 pages.

ISA Korean Intellectual Property Office, International Search Report Issued in Application No. PCT/KR2014/011366, dated Feb. 17, 2015, WIPO, 4 pages.

* cited by examiner

METHOD FOR TREATING SULFUR HEXAFLUORIDE USING RADIATION AND APPARATUS FOR COLLECTING AND TREATING BY-PRODUCTS

CROSS REFERENCE TO RELATED APPLICATIONS

The present application is a U.S. National Phase of International Patent Application Serial No. PCT/KR2014/011366, entitled "METHOD FOR TREATING SULFUR HEXAFLUORIDE USING RADIATION AND APPARATUS FOR COLLECTING AND TREATING BY-PRODUCTS," filed on Nov. 25, 2014, which claims priority to Korean Patent Application No. 10-2013-0166859, filed on Dec. 30, 2013, and to Korean Patent Application No. 10-2014-0054514, filed on May 8, 2014, the entire contents of each of which are hereby incorporated by reference for all purposes.

TECHNICAL FIELD

The present invention relates to a method for treating sulfur hexafluoride and an apparatus for collecting and treating by-products, and more particularly, to a method for treating sulfur hexafluoride and an apparatus for collecting and treating by-products capable of decomposing a mixed gas of sulfur hexafluoride ($SF_6$) and hydrogen ($H_2$) into hydrogen fluoride (HF) and sulfur (S) by irradiating radiation to the mixed gas, and safely treating the formed hydrogen fluoride and sulfur to collect and recycle the hydrogen fluoride and sulfur as a resource.

BACKGROUND ART

In most cases, compounds containing halogen elements such as F, Cl, Br, I, and the like have strong reactivity, such that the compounds have been usefully and widely used in industries such as sterilization, glass technique, a photographic film, and the like.

Among gases containing fluorine, particularly, $SF_6$, hydrofluorocarbon (HFC), and perfluorocarbon (PFC) are materials belonging to six greenhouse gases recognized by the United Nations Framework Convention on Climate Change (UNFCCC) and the Kyoto Protocol (December 1997), and recently, a warming problems by $NF_3$ has also been controversial.

These gases have been used as an insulation gas of heavy electric equipment, a semiconductor etching gas, and a refrigerant gas. Since a warming potential of $SF_6$ is 23,900 times that of $CO_2$ and lifetime of $SF_6$ is about 3,000 years, when $SF_6$ is emitted to the atmosphere once, $SF_6$ serves to almost permanently increase a global temperature. Therefore, in order to prevent global warming, an emission amount of $SF_6$ is restricted by each country, such that treatment of $SF_6$ is required.

As an existing method for treating the greenhouse gases such as fluorine compounds, and the like, there are a high-temperature incineration method, a pyrolysis method, a catalytic oxidation method, a plasma treatment method, and the like. However, in the high-temperature incineration method, secondary atmospheric environmental problems may be generated due to generation of $SO_x$, $NO_x$, and the like; in the pyrolysis method, a large amount of energy is consumed, and equipment may be corroded by pyrolysis by-products; in the catalytic oxidation method, poisoning of a catalyst may occur; and in a plasma decomposition method, there are problems such as excessive energy consumption, a low decomposition rate, and the like, such that there is a limitation in industrially utilizing these methods.

For example, a method for treating sulfur hexafluoride without supply of water under oxygen conditions is disclosed in Korean Patent No. 0860835, but there are problems as described above.

Particularly, in the case of a fluorine compound gas having a high concentration of 90% or more, treatment efficiency is low, such that an economical treatment method having high decomposition efficiency has been required.

DISCLOSURE

Technical Problem

An object of the present invention is to provide a method for collecting decomposition by-products in order to recycle the decomposition by-products while safely and efficiently treating sulfur hexafluoride having a high warming potential.

Another object of the present invention is to provide an efficient and economical apparatus for treating sulfur hexafluoride.

Technical Solution

The present invention relates to a method for treating sulfur hexafluoride and an apparatus for collecting and treating by-products. In one general aspect, a method for treating sulfur hexafluoride and collecting by-products includes:

a) reacting sulfur hexafluoride and hydrogen under radiation irradiation conditions to decompose and convert sulfur hexafluoride and hydrogen into sulfur and hydrogen fluoride; and b) condensing hydrogen fluoride in step a) in a liquid state to collect liquid hydrogen fluoride, or injecting hydrogen fluoride in step a) into an aqueous metal or non-metal ion solution to form a fluoride salt having high handling safety and then collecting the fluoride salt.

A metal ion of the aqueous metal ion solution may be an ion of a metal selected from Group I A metals, Group II B metals, Group III A metals, Group IV A metals, Group V A metals, Group VI A metals, Group VII A metals, Group VIII A (Group 8A) metals, Group I B metals, Group III B metals, and a mixed metal thereof. In detail, the metal ion may be an ion of one or two or more metals selected from Li, K, Mg, Ca, Sc, Y, La, Ac, Ti, Zr, Hf, V, Nb, Cr, Mo, W, Mn, Fe, Co, Ni, Ru, Rh, Pd, Os, Ir, Pt, Cu, B, Al, Ga, and In.

The radiation may be an electron beam, gamma ray, or ion beam, and a total radiation dose may be 50 to 500 KGy.

An amount of hydrogen may be 3 to 6 moles based on 1 mole of sulfur hexafluoride.

Sulfur hexafluoride may be generated in a process or an apparatus using sulfur hexafluoride as an adiabatic gas, an insulating gas, or a semiconductor etching gas.

In another general aspect, an apparatus for treating sulfur hexafluoride using radiation, the apparatus includes: a sulfur hexafluoride decomposition chamber into which sulfur hexafluoride ($SF_6$) and hydrogen ($H_2$) are introduced; a radiation irradiation device irradiating radiation to sulfur hexafluoride ($SF_6$) and hydrogen ($H_2$) introduced into the sulfur hexafluoride decomposition chamber; a sulfur collection part collecting sulfur from a mixture of hydrogen fluoride and sulfur discharged from the sulfur hexafluoride decomposition chamber in which sulfur hexafluoride ($SF_6$)

and hydrogen ($H_2$) are decomposed into hydrogen fluoride (HF(v)) and sulfur (S(s)) by irradiating radiation; a liquid hydrogen fluoride collection part condensing hydrogen fluoride discharged from the sulfur collection part to collect hydrogen fluoride in a liquid state; and pipes each connecting the sulfur hexafluoride decomposition chamber, the sulfur collection part, and the liquid hydrogen fluoride collection part to each other to distribute hydrogen fluoride or sulfur.

In another general aspect, an apparatus for treating sulfur hexafluoride using radiation, the apparatus includes: a sulfur hexafluoride decomposition chamber into which sulfur hexafluoride ($SF_6$) and hydrogen ($H_2$) are introduced; a radiation irradiation device irradiating radiation to sulfur hexafluoride ($SF_6$) and hydrogen ($H_2$) introduced into the sulfur hexafluoride decomposition chamber; a sulfur collection part collecting sulfur from a mixture of hydrogen fluoride and sulfur discharged from the sulfur hexafluoride decomposition chamber in which sulfur hexafluoride ($SF_6$) and hydrogen ($H_2$) are decomposed into hydrogen fluoride (HF(v)) and sulfur (S(s)) by irradiating radiation; a fluoride salt collection part injecting hydrogen fluoride discharged from the sulfur collection part into an aqueous metal or non-metal ion solution to collect hydrogen fluoride in a form of a fluoride salt formed by a reaction between the hydrogen fluoride and metal or non-metal ions; and pipes each connecting the sulfur hexafluoride decomposition chamber, the sulfur collection part, and the fluoride salt collection part to each other to distribute hydrogen fluoride or sulfur.

Advantageous Effects

Since a method for treating sulfur hexafluoride according to the present invention is a method capable of producing a commercially recyclable high-purity material while decreasing emission of greenhouse gas causing global warming by decomposing and converting sulfur hexafluoride into sulfur and hydrogen fluoride with added values using radiation, the method is significantly useful in economic and environmental points of view.

Since in the method for treating sulfur hexafluoride according to the present invention, sulfur hexafluoride is treated using the radiation, particularly, high-concentration sulfur hexafluoride may be treated with high efficiency, such that the method is significantly effective and economical.

Since the method for treating sulfur hexafluoride according to the present invention does not generate secondary air pollution by treating sulfur hexafluoride having a high warming potential using the radiation and an aqueous metal or non-metal ion solution unlike the related art, and sulfur hexafluoride is converted into recyclable materials, the method is a significantly economical and eco-friendly method.

Since a decomposition reaction of sulfur hexafluoride by the radiation is a process which is performed at room temperature and atmospheric pressure and rarely generates wastes, this process corresponds to a safer and cleaner technology, and since an oxidation decomposition reaction does not occur during the treatment, by-products are simple, such that the method is eco-friendly.

A filter blocking problem may be solved by using a cyclone instead of collecting sulfur using a filter according to the related art, and discharge flowability may be improved by removing a factor of inhibiting a flow of gas (hydrogen fluoride) to be discharged.

Particularly, a large amount of high-concentration sulfur hexafluoride may be treated with high efficiency by using the radiation, more specifically, an electron beam, such that the method is significantly effective and economical.

Further, hydrogen fluoride, which is a harmful material generated at the time of decomposing sulfur hexafluoride, may be collected in a form of a fluoride salt, such that it is possible to collect hydrogen fluoride in a form of a safe material which is not harmful.

In addition, hydrogen fluoride may be condensed to thereby be collected in a form of high-purity liquid hydrogen fluoride, and in this case, since high-purity liquid hydrogen fluoride may be recycled as an industrial raw material used in a semiconductor etching process, or the like, as compared to a method for collecting hydrogen fluoride in a form such as a fluoride salt, treatment cost may be significantly decreased, such that this method has high economical efficiency.

Further, in an apparatus for treating sulfur hexafluoride according to the present invention, a decomposition rate may be improved by configuring a process so that hydrogen and sulfur hexafluoride that are not reacted but remain are collected in a device for collecting unreacted gas and re-introduced into a sulfur hexafluoride decomposition chamber to thereby be completely decomposed.

A technology for stably treating sulfur hexafluoride, one of the greenhouse gases, and collecting decomposition by-products as described above may be used as a technology for dealing with regulations in terms of an environmental point of view. Further, since the decomposition efficiency is excellent, the technology is excellent as compared to other technologies.

Further, in an economic/industrial point of view, it is possible to expect to economic profit through a technology for decomposing and converting high-concentration sulfur hexafluoride generated in heavy electric equipment as well as low-concentration sulfur hexafluoride generated in semiconductor and electronic industrial processes into sulfur and hydrogen fluoride with added values, and collecting sulfur and hydrogen fluoride.

DETAILED DESCRIPTION OF MAIN ELEMENTS

Figure 1:
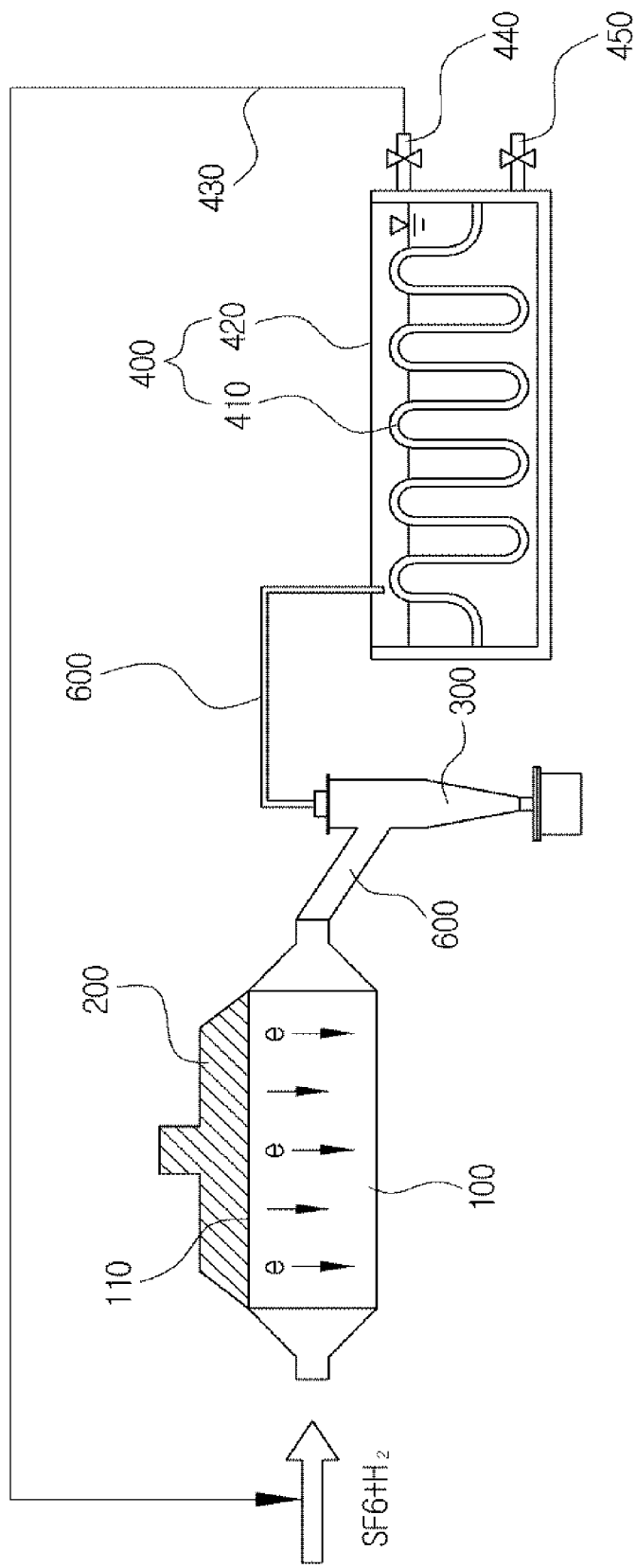
FIG. 1 is a schematic diagram illustrating an apparatus for treating sulfur hexafluoride using radiation according to an exemplary embodiment of the present invention.

10: gas mixer 20: filter device
100: sulfur hexafluoride decomposition chamber 110: window
200: radiation irradiation device 300: sulfur collection part
400: liquid hydrogen fluoride collection part 410: cooling unit
420: storage vessel 430: first collection line
500: fluoride salt collection part 510: bubbling device 520: reaction vessel 530: second collection line
600: pipes Best Mode The present invention relates to a method for treating sulfur hexafluoride and collecting by-products capable of having high treatment efficiency and economical efficiency while safely treating sulfur hexafluoride. A method for treating and collecting sulfur hexafluoride according to the present invention includes:

a) reacting sulfur hexafluoride and hydrogen by irradiating radiation to decompose and convert sulfur hexafluoride and hydrogen into sulfur and hydrogen fluoride; and b) condensing hydrogen fluoride in step a) in a liquid state to collect liquid hydrogen fluoride, or injecting hydrogen fluoride in step a) into an aqueous metal or non-metal ion solution to form a fluoride salt having high handling safety and then collecting the fluoride salt.

The method for treating sulfur hexafluoride according to the present invention has advantages of high economical efficiency, and particularly, significantly high decomposition efficiency of high-concentration sulfur hexafluoride by using radiation.

The radiation according to an exemplary embodiment of the present invention may be an electron beam, gamma ray, or ion beam, and in view of decomposition efficiency of sulfur hexafluoride, preferably, the radiation may be the electron beam.

The radiation used for decomposition of sulfur hexafluoride according to the present invention, particularly, the electron beam is a flow of electrons having a constant direction, and the electron, which is part of an atom or a molecule, is a kind of elementary particle, having a mass of about 1/1800 of the mass of an atomic nucleus and a negative charge. In order to decompose fluorides bound to sulfur hexafluoride using the electron beam, first, there is a need to form electrons for forming the electron beam, and these electrons are formed by an electron gun. That is, in the case of applying a current to a filament of the electron gun to heat the filament, a temperature of the filament is increased to a high temperature of about 2700° C. At this time, a large number of free electrons are emitted from the filament. A speed of the formed free electrons, that is, energy is adjusted by a potential difference applied to an anode, and the electron beam is irradiated to a treatment target object by adjusting the energy depending on the target material and treatment purpose.

Electrons are accelerated close to the speed of light in an electron beam accelerator, and when the accelerated electrons collide with an object to be irradiated, energy of the accelerated electrons are converted into heat energy, and ionization energy and excitation energy of atoms or molecules of the object to be irradiated. Since the electrons have a small mass, at the time of the collision, only a small amount of energy is lost, and until the energy is completely consumed, a large number of consecutive collisions occur. The total number of electrons formed from one electron by consecutive collision reaches to tens of thousands, and ions, radicals, and excited molecules and atoms are formed during the process as described above, such that a reaction is terminated within several seconds.

Mostly, an electron beam of a commercially used electron beam accelerator uses energy of 100 KeV to 10 MeV, and since the energy of the electron beam is significantly higher than that of infrared (IR) rays, ultraviolet (UV) rays, X-rays, or γ-rays, decomposition efficiency is high and a penetration depth for an object is deep, such that it is possible to treat a large amount of the object. Particularly, since a decomposition reaction by the electron beam is a process which is performed at room temperature and atmospheric pressure and rarely generates wastes, this process corresponds to a clean technology, and since an oxidation decomposition reaction does not occur during the treatment, this process corresponds to an eco-friendly technology.

A total radiation dose according to the exemplary embodiment of the present invention, in detail, a total radiation dose of the electron beam may be 50 to 500 KGy, but in view of effective decomposition of sulfur hexafluoride and economical efficiency, preferably, the total radiation dose may be 50 to 200 KGy.

The metal ion of the aqueous metal ion solution according to the exemplary embodiment of the present invention is not limited but may be an ion of Group I A metals, Group II B metals, Group III A metals, Group IV A metals, Group V A metals, Group VI A metals, Group VII A metals, Group VIII A (Group 8A) metals, Group I B metals, Group II B metals, and a mixed metal thereof. Preferably, the metal ion may be an ion of the Group I A metal, the Group II B metal, or a mixed metal thereof.

A metal existing in an ionic form in the aqueous metal ion solution according to the exemplary embodiment of the present invention is not limited, but may be, specifically, one or two or more selected from Li, K, Mg, Ca, Sc, Y, La, Ac, Ti, Zr, Hf, V, Nb, Cr, Mo, W, Mn, Fe, Co, Ni, Ru, Rh, Pd, Os, Ir, Pt, Cu, B, Al, Ga, and In. In view of effectively and economically forming the fluoride salt, the metal may be preferably one or two or more selected from Li, K, Mg, Ca, Co, and Ba, and more preferably, one or two or more selected from K, Mg, Ca, Co, and Ba.

In view of economical efficiency and an effective reaction of hydrogen fluoride, the metal in the aqueous metal ion solution according to the exemplary embodiment of the present invention may be preferably Ca or K.

A concentration of the aqueous metal ion solution according to the exemplary embodiment of the present invention is not limited, but may be in a range recognized by those skilled in the art, depending on a concentration of hydrogen fluoride which will react with the metal ion to form the fluoride salt, wherein the concentration of hydrogen fluoride is resulted from a concentration of the introduced sulfur hexafluoride, and the concentration of the aqueous metal ion solution may be changed in consideration of a concentration and an amount of the introduced hydrogen fluoride.

Hydrogen according to the exemplary embodiment of the present invention is used to react with sulfur hexafluoride to thereby be decomposed and converted into sulfur and hydrogen fluoride, and this reaction is represented by the following Reaction Formula 1.

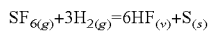   [Reaction Formula 1]

As illustrated in Reaction Formula 1, an amount of hydrogen according to the exemplary embodiment of the present invention may be 3 moles or more, and preferably, 3 to 6 moles based on 1 mole of sulfur hexafluoride.

Sulfur hexafluoride in the present invention may be generated in a process or apparatus using sulfur hexafluoride as an adiabatic gas or insulating gas, for example, heavy electric equipment. The heavy electric equipment according to the present invention may be equipment obviously recognized by those skilled in the art. For example, the heavy electric equipment may be power transmission and distribution facilities in all. In detail, the heavy electric equipment may be a power generator, an electric motor, an electric transformer, a gas insulated switchgear, and the like. The heavy electric equipment according to the exemplary embodiment of the present invention may be power transmission and distribution equipment having a high concentration of sulfur hexafluoride (for example, an electric transformer, a gas insulated switchgear, or the like).

The method for treating sulfur hexafluoride according to the present invention may further include c) separating and collecting the liquid hydrogen fluoride or fluoride salt obtained in step b) in order to commercially use the liquid hydrogen fluoride or fluoride salt.

In the method for treating sulfur hexafluoride according to the present invention, sulfur hexafluoride and hydrogen are decomposed and converted into sulfur and hydrogen fluoride by radiation having high energy, and sulfur formed at this time is collected as solid powder, and hydrogen fluoride is condensed to thereby be collected as liquid hydrogen fluoride or is treated by the aqueous metal ion solution to thereby be collected as the fluoride salt, that is, a water-insoluble fluoride salt having high handling safety.

Further, sulfur and liquid hydrogen fluoride or the fluoride salt generated by treating sulfur hexafluoride according to the present invention may be commercially recycled, which is significantly economical and eco-friendly.

Sulfur hexafluoride ($SF_6$) to be decomposed and treated in the present invention, which is a representative hardly decomposable greenhouse gas, is generated in various industrial actions including an insulation gas process of the heavy electric equipment and a semiconductor process (for example, an etching process, a chemical deposition process, and the like). Particularly, high-purity sulfur hexafluoride has been used in the heavy electric equipment such as an electric transformer, a gas insulated switchgear, and the like, and sulfur hexafluoride accounts for about 80% or more of the entire gas generated therein.

FIG. 1 is a schematic diagram illustrating an apparatus for treating sulfur hexafluoride using radiation according to an exemplary embodiment of the present invention. Referring to FIG. 1, the apparatus according to the exemplary embodiment of the present invention includes a sulfur hexafluoride decomposition chamber 100, a radiation irradiation device 200, a sulfur collection part 300, a liquid hydrogen fluoride collection part 400, and pipes 600.

A space into which sulfur hexafluoride ($SF_6$) and hydrogen ($H_2$) are introduced and flow is provided in the sulfur hexafluoride decomposition chamber 100, and the sulfur hexafluoride decomposition chamber may be formed in a long box shape extended in one direction.

The radiation irradiation device 200 may be a device for irradiating radiation to sulfur hexafluoride and hydrogen introduced into the sulfur hexafluoride decomposition chamber 100.

The apparatus for treating sulfur hexafluoride according to the exemplary embodiment illustrated in FIG. 1 is configured so that a window 110 allowing radiation to pass therethrough is formed in an upper portion of the sulfur hexafluoride decomposition chamber 100, and the radiation generated in the radiation irradiation device 200 passes through the window 110 to thereby be irradiated into the sulfur hexafluoride decomposition chamber 100. The window 110 may be, for example, titanium foil installed at an upper end opening of the sulfur hexafluoride decomposition chamber 100.

In detail, when the radiation generated by the radiation irradiation device 200 and passed through the window 110 formed in one side of the sulfur hexafluoride decomposition chamber 100 is irradiated while sulfur hexafluoride and hydrogen are introduced into and flow in the sulfur hexafluoride decomposition chamber 100, sulfur hexafluoride and hydrogen are decomposed into hydrogen fluoride and sulfur by the radiation.

A reaction when sulfur hexafluoride and hydrogen react with each other by the radiation to thereby be decomposed into hydrogen fluoride and sulfur is represented by Reaction Formula 1.

As illustrated in Reaction Formula 1, a concentration of hydrogen may be 3 moles or more, preferably, 3 to 6 moles, based on 1 mole of sulfur hexafluoride. It is preferable that the number of moles of hydrogen is at least three time that of sulfur hexafluoride so that sulfur hexafluoride is completely decomposed and converted into sulfur and hydrogen fluoride. When the number of moles of hydrogen is less than 3 times that of sulfur hexafluoride, some of the sulfur hexafluoride may not be decomposed to thereby be released as it is. Therefore, there is a need to introduce hydrogen into the sulfur hexafluoride decomposition chamber in an amount of at least three times the number of moles of sulfur hexafluoride.

Figure 2:
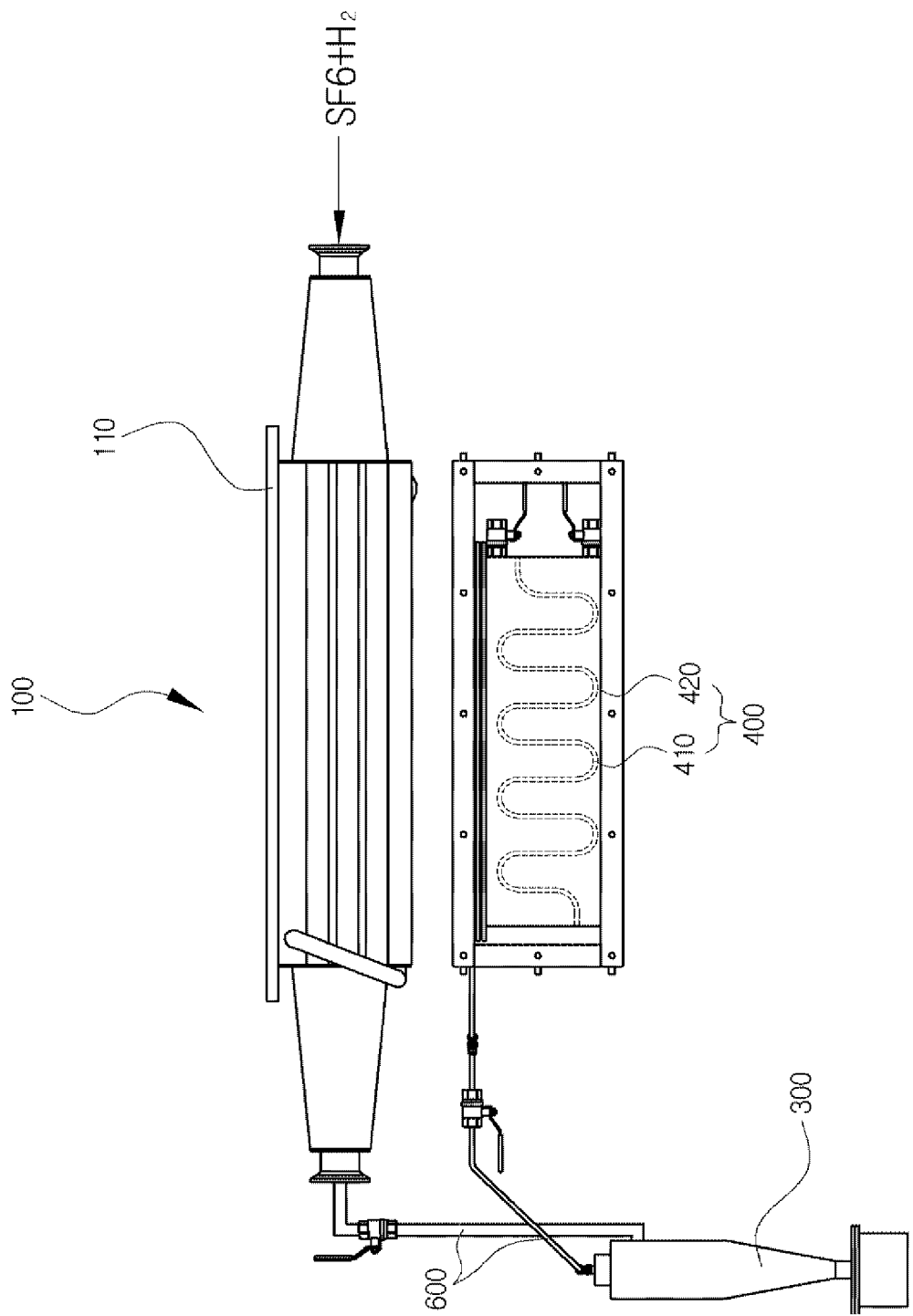
FIG. 2 is a schematic diagram illustrating another example of the apparatus of FIG. 1.

Meanwhile, the radiation irradiation device 200 illustrated in FIG. 1 is manufactured so that the radiation irradiation device 200 is positioned to be close to an upper portion of the window 110 of the sulfur hexafluoride decomposition chamber 100 and thus energy of high-speed electrons is transferred with high efficiency, but which is only an example of the apparatus for treating sulfur hexafluoride according to the present invention. FIG. 2 is a schematic diagram illustrating another example of the apparatus of FIG. 1. A radiation irradiation device of FIG. 2 is a commercial radiation accelerator (not illustrated) which is generally used, and a sulfur hexafluoride decomposition chamber 100 is positioned below the radiation accelerator to thereby be irradiated with radiation.

A total radiation dose according to the present invention may be 50 to 500 KGy, but in view of effective decomposition of sulfur hexafluoride and economical efficiency, preferably, the total radiation dose may be 50 to 200 KGy. However, the total radiation dose may be variously changed depending on specifications of the radiation irradiation device 200 and the sulfur hexafluoride decomposition chamber 100, amounts of materials to be treated, or the like.

In this case, the radiation irradiation device 200 may further include a control unit (not illustrated) for controlling the radiation dose, an irradiation time, and the like.

Further, when the sulfur hexafluoride decomposition chamber 100 in the radiation accelerator is exposed to an environment in which radiation is continuously irradiated, a temperature of the sulfur hexafluoride decomposition chamber 100 is gradually increased, thereby causing thermal deformation of the apparatus. Therefore, in order to decrease the temperature of the sulfur hexafluoride decomposition chamber 100, a sulfur hexafluoride decomposition chamber cooling device (not illustrated) may be further provided on an outer surface of the sulfur hexafluoride decomposition chamber.

Next, the sulfur collection part 300 may be a device collecting sulfur from the mixture of hydrogen fluoride and sulfur discharged from the sulfur hexafluoride decomposition chamber 100 in which sulfur hexafluoride ($SF_6$) and hydrogen ($H_2$) are decomposed into hydrogen fluoride (HF (v)) and sulfur (S(s)) by irradiating radiation. In this case, sulfur introduced into the sulfur collection part 300 may be in a solid particle state, and sulfur may be separately collected using a filter. More preferably, as illustrated in FIGS. 1 and 2, the sulfur collection part 300 may be a cyclone collecting sulfur particles using centrifugal force, and in the case of using the cyclone, a filter blocking problem occurring at the time of using a filter for a long period of time does not occur. Therefore, a factor of inhibiting a flow of the discharged gas (hydrogen fluoride) is removed, such that flowability of the discharged gas may be improved.

Prior to describing the liquid hydrogen fluoride collection part 400, first, the pipes 600 will be described. The pipes 600 may directly connect the sulfur hexafluoride decomposition chamber 100, the sulfur collection part 300, and the liquid hydrogen fluoride collection part 400, respectively, thereby serving to distribute hydrogen fluoride or sulfur. In this case, the pipe 600 connecting the sulfur hexafluoride decomposition chamber 100 and the sulfur collection part 300 may have a large inner diameter in consideration of distribution of particulate sulfur, and more preferably, as illustrated in FIGS. 1 and 2, the pipe 600 may be provided to be inclined, such that the sulfur particles are collected in the cyclone as much as possible.

Meanwhile, according to the present invention, hydrogen fluoride decomposed in and discharged from the sulfur hexafluoride decomposition chamber 100 may be condensed at 19.5° C. Since it is preferable to distribute gas-phase hydrogen fluoride having good flowability in the present invention, it is more preferable that a heating unit (not illustrated) for maintaining a temperature to be equal to or higher than a condensation temperature is further provided in the sulfur collection part 300 and the pipe 600 so that hydrogen fluoride is not condensed. As the heating unit, a generally used heat wire may be used, but any heating unit may be used without limitation as long as it serves to generate heat or maintain a temperature.

Further, in order to prevent corrosion by hydrogen fluoride discharged from the sulfur hexafluoride decomposition chamber 100, it is preferable that inner portions of the sulfur collection part 300 and the pipe 600 in which hydrogen fluoride is distributed are coated with polyethylene (PE) or Teflon.

Hydrogen fluoride, which is highly toxic and highly corrosive and is an unstable material capable of being easily diffused to the surroundings at room temperature, is a harmful material which is hard to handle.

The liquid hydrogen fluoride collection part 400 treating this hydrogen fluoride is a device condensing hydrogen fluoride, which is a gas discharged from the sulfur collection part 300 after collecting sulfur, to collect hydrogen fluoride in a liquid state. The liquid hydrogen fluoride collection part 400 collecting hydrogen fluoride in the liquid state is composed of a cooling unit 410 condensing the introduced hydrogen fluoride in the liquid state and a liquid hydrogen fluoride storage vessel 420 filled with the condensed liquid hydrogen fluoride. Although a case in which the cooling unit 410 has a pipe shape in which the cooling unit 410 is provided outside the storage vessel 420 and allows cooling gas to circulate therein is illustrated in FIGS. 1 and 2, as the cooling unit 410 as described above, any cooling unit may be used without particular limitation as long as it serves to condense hydrogen fluoride.

Further, an outlet may be formed in a lower portion of the storage vessel 420, such that hydrogen fluoride condensed so as to have a purity close to 100% may be collected.

As compared to a method for adding a separate reagent according to the related art in order to convert hydrogen fluoride gas having high harmfulness into a stable salt form, cost consumed for the reagent may be deceased, and hydrogen fluoride collected in the liquid state may be utilized in a semiconductor etching process, or the like, thereby making it possible to increase economical efficiency. That is, cost for treating hydrogen fluoride may be significantly decreased, and hydrogen fluoride may also be utilized in other industries, such that the method according to the present invention may have the advantage of killing two birds with one stone.

Further, in the apparatus for treating sulfur hexafluoride according to the exemplary embodiment of the present invention, a first collection line 430 for collecting gas that is not condensed but remains in the liquid hydrogen fluoride collection part 400 may be further provided. As illustrated in FIG. 1, the first collection line 430 may be connected to an upper portion of the storage vessel 420 to thereby allow gas that is not condensed or unreacted gas to be collected, and may be connected onto an introduction path of the sulfur hexafluoride decomposition chamber 100 to allow the collected gas to be re-introduced into the sulfur hexafluoride decomposition chamber 100.

When vapor phase hydrogen fluoride is cooled to be 19.5° C. or less by the cooling unit, the vapor phase hydrogen fluoride is condensed to thereby be filled in a liquid state in the storage vessel 420, but when hydrogen and sulfur hexafluoride are not completely discomposed, hydrogen, undecomposed sulfur hexafluoride, $SF_5$, $SF_4$, and the like, discharged from the sulfur hexafluoride decomposition chamber 100 are not condensed but are collected in the upper portion of the storage vessel 420. When the remaining gas as described above is re-introduced into the sulfur hexafluoride decomposition chamber 100 through the first collection line 430, since sulfur hexafluoride may be completely decomposed while the gas is continuously circulated, treatment efficiency may be improved.

Further, although not illustrated, according to the present invention, a plurality of sulfur collection parts 300 and a plurality of liquid hydrogen fluoride collection parts 400 may be provided, such that a continuous process may be performed. For example, while accumulated sulfur and liquid hydrogen fluoride are collected in one sulfur collection part 300 and one liquid hydrogen fluoride collection part 400, the apparatus is connected to another sulfur collection part 300 and another liquid hydrogen fluoride collection part 400, such that the apparatus may be operated.

Figure 3:
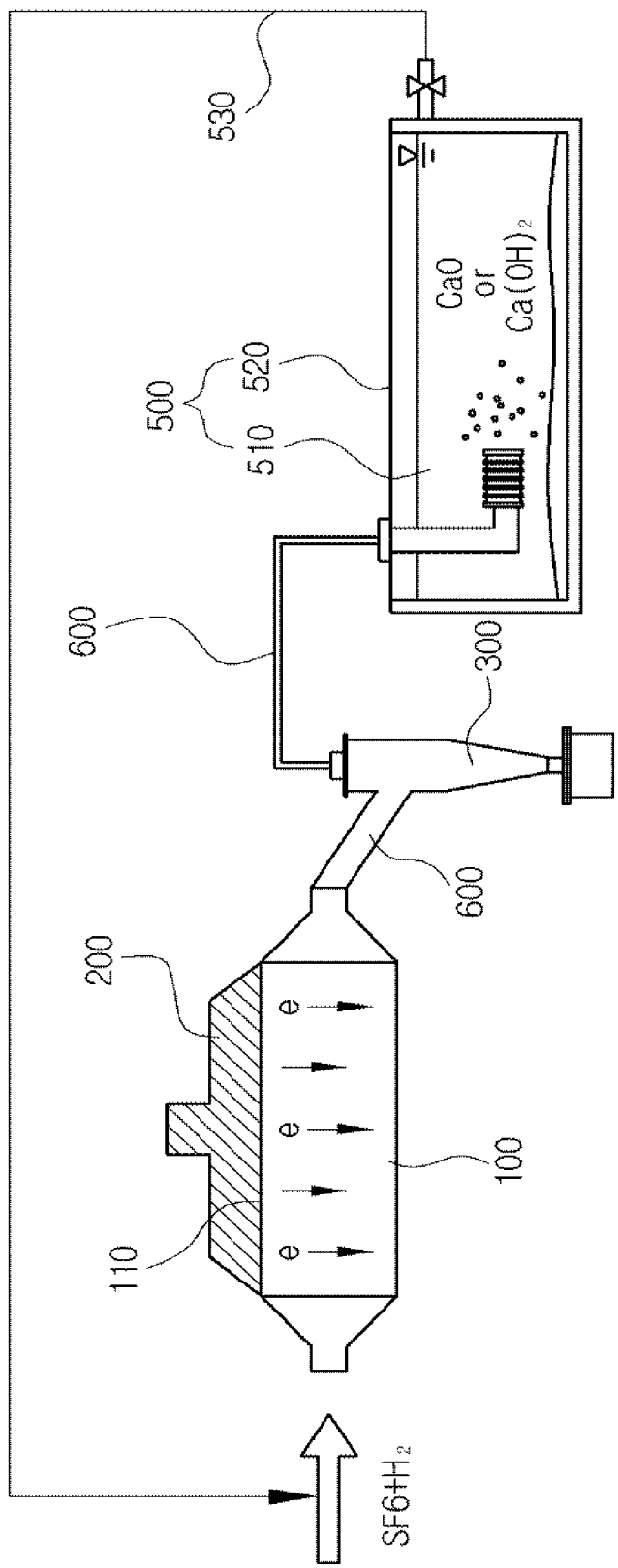
FIG. 3 is a schematic diagram illustrating an apparatus for treating sulfur hexafluoride using radiation according to another exemplary embodiment of the present invention.

FIG. 3 is schematic diagram illustrating an apparatus for treating sulfur hexafluoride using radiation according to another exemplary embodiment of the present invention.

In the present exemplary embodiment, the same components corresponding to the components according to the above-mentioned exemplary embodiment will be denoted by the same reference numerals.

As illustrated in FIG. 3, the apparatus according to another exemplary embodiment of the present invention may include a sulfur hexafluoride decomposition chamber 100, a radiation irradiation device 200, a sulfur collection part 300, a fluoride salt collection part 500, and pipes 600.

The sulfur hexafluoride decomposition chamber 100, the radiation irradiation device 200, the sulfur collection part 300, and the pipes 600 are the same as those in the exemplary embodiment of the present invention illustrated in FIG. 1, but there is a difference in that the apparatus according to the exemplary embodiment includes the fluoride salt collection part 500 bubbling and injecting hydrogen fluoride in an aqueous metal or non-metal ion solution to collect a fluoride salt formed by reaction with metal or non-metal ion, instead of the liquid hydrogen fluoride collection part 400 condensing vapor-phase hydrogen fluoride to collect hydrogen fluoride in the liquid state.

Figure 4:
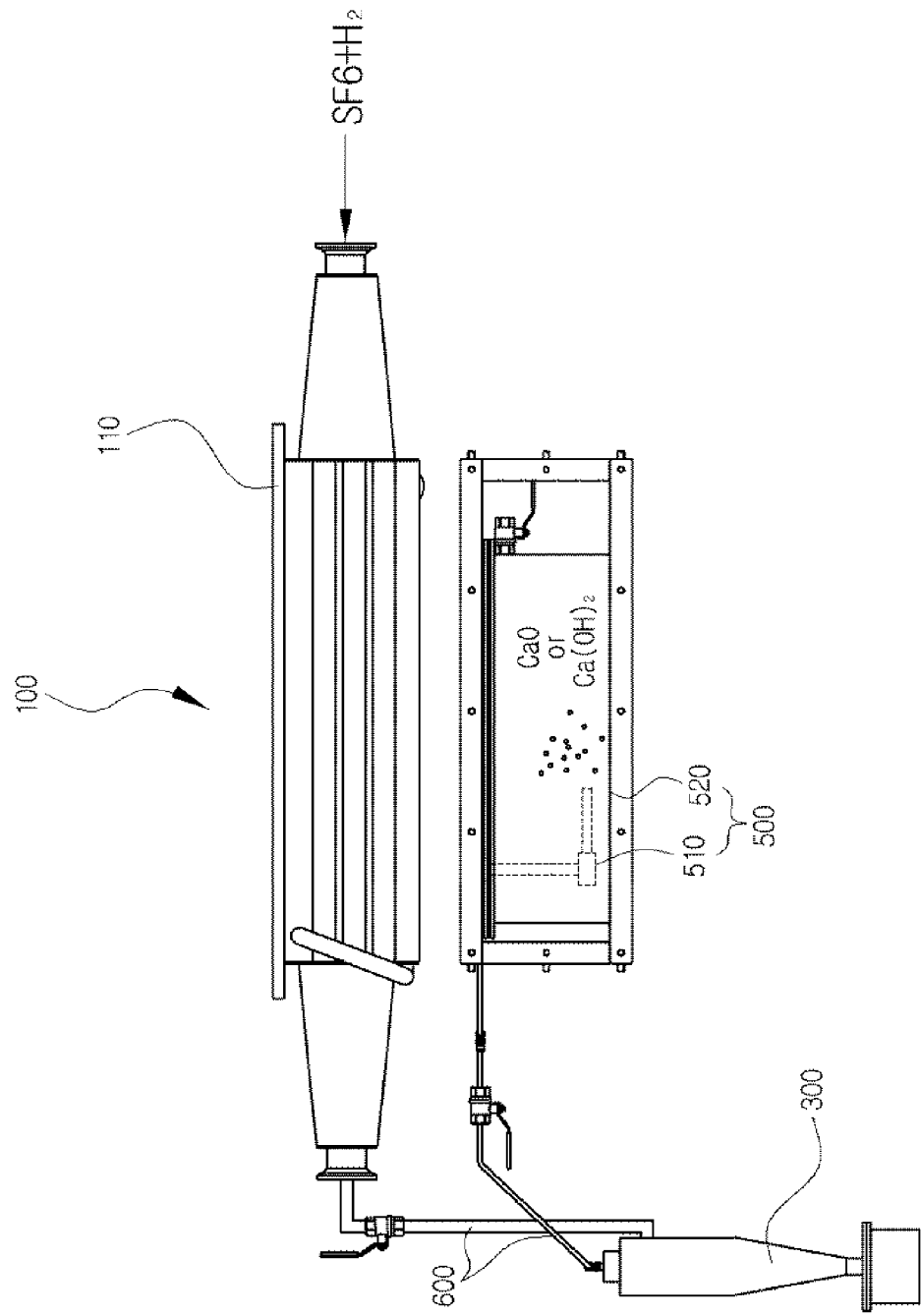
FIG. 4 is a schematic diagram illustrating another example of the apparatus of FIG. 3.

Meanwhile, FIG. 4, which is a schematic diagram illustrating another example of the apparatus of FIG. 3, illustrates a case in which the apparatus for treating sulfur hexafluoride of FIG. 3 is installed at a lower end portion of a radiation accelerator (not illustrated) as described above.

Referring to FIGS. 3 and 4, the fluoride salt collection part 500 is composed of a bubbling device 510 bubbling and injecting introduced hydrogen fluoride in a form of micro-bubbles into the aqueous metal or non-metal ion solution and a reaction vessel 520 which is filled with the aqueous metal or non-metal ion solution and in which the injected hydrogen fluoride in the form of micro-bubbles and the metal or non-metal ion react with each other to thereby form a fluoride salt.

In the case of bubbling and injecting hydrogen fluoride gas in the form of micro-bubbles in the solution as described above, a contact surface area between hydrogen fluoride bubbles and the aqueous metal or non-metal ion solution is increased, such that reaction efficiency may be increased. In this case, in view of reaction efficiency, it is advantageous to bubble the micro-bubbles to be as small as possible at a micro unit.

Meanwhile, the aqueous metal or non-metal ion solution is not particularly limited, but in view of effectively forming the fluoride salt which is not harmful and has low solubility and economical efficiency, it is preferable that the aqueous metal or non-metal ion solution contains ions of one or two or more selected from K, Mg, Ca, CO, and Ba. As a representative example, a $CaCl_2$ solution containing Ca ions is used, and a reaction between hydrogen fluoride and the $CaCl_2$ solution is represented by the following Reaction Formula 2.

$2HF+CaCl_2=CaF_2(s)+2HCl$ [Reaction Formula 2]

HF is a material having a large ionization tendency and when HF is injected into the $CaCl_2$ solution, HF is ionized into $H^+$ and $F^-$, and $F^-$ ions bind to $Ca^{++}$ having high affinity to form a $CaF_2$ salt as illustrated in Reaction Formula 2. Since $CaF_2$, which is a material having low solubility, is not dissolved but is precipitated in the reaction vessel 520, thereby making it possible to collect hydrogen fluoride in a form of the fluoride salt.

Meanwhile, when hydrogen fluoride reacts with the $CaCl_2$ solution, while $CaF_2$ is formed, hydrochloric acid (HCl) is also formed, such that there is a need to discard the acid.

Therefore, it is more preferable to use a CaO (calcium oxide) solution, a $Ca(OH)_2$ (calcium hydroxide) solution, or a KOH solution instead of the $CaCl_2$ solution. Since these solutions form water instead of hydrochloric acid, there is no need to separately discard the acid, and cost consumed to discard the acid may also be decreased.

Further, as in the apparatus for treating sulfur hexafluoride according to the exemplary embodiment illustrated in FIG. 3, a second collection line 530 for collecting gas that is not dissolved but remains in the aqueous metal or non-metal ion solution in the fluoride salt collection part 500 may be further provided. The second collection line 530 may be connected to an upper portion of the reaction vessel 520 and an introduction path of the sulfur hexafluoride decomposition chamber 100, thereby making it possible to allow the collected gas to be re-introduced into the sulfur hexafluoride decomposition chamber 100.

Further, as in the exemplary embodiment described above, a plurality of sulfur collection parts 300 and a plurality of fluoride salt collection parts 500 may be provided, such that the apparatus for treating sulfur hexafluoride according to the present invention may be continuously operated without interruption. Therefore, while accumulated sulfur and fluoride salt are removed in one sulfur collection part 300 and one fluoride salt collection part 500, the apparatus is connected to another sulfur collection part 300 and another fluoride salt collection part 500, such that the apparatus may be operated.

Figure 5:
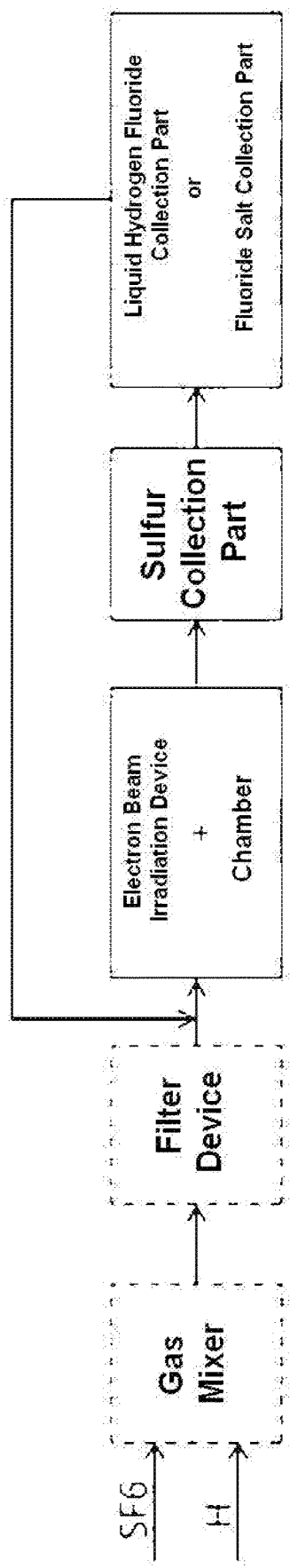
FIG. 5 is a block diagram illustrating an apparatus for treating sulfur hexafluoride using radiation according to another exemplary embodiment of the present invention.

Meanwhile, FIG. 5 is a block diagram illustrating an apparatus for treating sulfur hexafluoride using radiation according to another exemplary embodiment of the present invention. According to another exemplary embodiment of the present invention, a gas mixer 10 mixing sulfur hexafluoride and hydrogen with each other to allow the mixture to be introduced into a sulfur hexafluoride decomposition chamber 100 may be further provided, and a filter device 20 allowing other materials not to be introduced except for sulfur hexafluoride and hydrogen may also be further provided on an introduction path of the sulfur hexafluoride decomposition chamber 100.

This is to prevent by-products except for sulfur and hydrogen fluoride from being formed during a treatment process of sulfur hexafluoride. For example, nitrogen ($N_2$) gas used in a semiconductor process may be contained in sulfur hexafluoride generated in the semiconductor process. Since the nitrogen gas may cause an undesired reaction during the treatment process of sulfur hexafluoride, nitrogen gas is removed in advance.

The filter device 20 may be a gas-selective membrane and a case in which the filter device 20 is disposed between the gas mixer 10 and the sulfur hexafluoride decomposition chamber 100 is illustrated in FIG. 5. A position of the filter device 20 is not necessarily limited thereto, but the filter device 20 may also be formed at a front end of the gas mixer 10.

If necessary, a control unit controlling a gas amount, a filtering amount, and the like, and a pump for supplying gas may be further provided in each of the gas mixer 10 and the filter device 20.

Although a case in which remaining hydrogen, un-decomposed sulfur hexafluoride, and the like, are introduced into a path between the filter device 20 and the sulfur hexafluoride decomposition chamber 100 is illustrated in FIG. 5 by way of example, the present invention is not necessarily limited thereto. That is, the apparatus may also be configured so that remaining hydrogen, un-decomposed sulfur hexafluoride, and the like, are introduced in a front end or rear end of the gas mixer 10.

Further, there is a need to prevent hydrogen fluoride, which is a harmful material generated during the treatment process of sulfur hexafluoride, from being leaked by designing the apparatus for treating sulfur hexafluoride so as to be isolated from the outside and be closed.

A technology for stably treating and collecting sulfur hexafluoride, which is one of the greenhouse gases as described above may be used as a technology for dealing with regulations in an environmental point of view. In addition, it is possible to expect an energy saving effect due to improvement of decomposition efficiency.

Further, in an economic/industrial point of view, it is possible to expect to economic profit through a technology for decomposing and converting high-concentration sulfur hexafluoride generated in heavy electric equipment as well as the semiconductor and electronic industrial processes into sulfur and hydrogen fluoride with added values.

Particularly, a method for condensing hydrogen fluoride to collect hydrogen fluoride in a form of high-purity liquid hydrogen fluoride may significantly decrease treatment cost as compared to a method for collecting hydrogen fluoride in a form of stable fluoride salt, and at the same time, the hydrogen fluoride may be utilized as an industrial raw material, such that this method has high economical efficiency.

Hereinafter, the method for treating sulfur hexafluoride according to the present invention will be described through specific Examples, but claims of the present invention are not limited thereto.

EXAMPLE 1

10 L of sulfur hexafluoride was introduced together with 40 L of hydrogen at a rate of 50 L/min into a radiation irradiation device, and irradiated with an electron beam so that a total radiation dose was 200 KGy.

Thereafter, the formed sulfur and hydrogen fluoride were introduced into a sulfur collection part to collect 11 g of sulfur, and hydrogen fluoride discharged from the sulfur collection part was introduced into a fluoride salt collection part containing an aqueous $CaCl_2$ solution, thereby collecting 90 g of $CaF_2$.

In a method for treating sulfur hexafluoride according to the present invention, sulfur was obtained with a yield of 80% or more by decomposing sulfur hexafluoride, and 90% or more of fluorine was also obtained in a form of a fluoride salt.

EXAMPLE 2

The same processes were performed as those in Example 1 except for using an aqueous KOH solution instead of the aqueous $CaCl_2$ solution contained in the fluoride salt collection part in Example 1, thereby collecting 9 g of sulfur and obtaining 88 g of KF.

It may be appreciated that in the method for treating sulfur hexafluoride according to the present invention as in the Examples, since sulfur hexafluoride, which is greenhouse gas, may be safely treated at low cost and at the same time, the collected sulfur and fluoride salt may be industrially recycled, the method is a significantly economical and efficient method for treating sulfur hexafluoride.

The invention claimed is:

1. A method for treating sulfur hexafluoride generated in heavy electric equipment using a treatment apparatus including: a sulfur hexafluoride decomposition chamber into which a filtered mixed gas consisting of sulfur hexafluoride and hydrogen is introduced; a radiation irradiation device irradiating radiation to the filtered mixed gas introduced into the sulfur hexafluoride decomposition chamber; a sulfur collection part which is a cyclone collecting sulfur using centrifugal force from a mixture of hydrogen fluoride and sulfur discharged from the sulfur hexafluoride decomposition chamber in which the sulfur hexafluoride and hydrogen are decomposed into hydrogen fluoride and sulfur by irradiating radiation; a liquid hydrogen fluoride collection part condensing hydrogen fluoride discharged from the sulfur collection part to collect hydrogen fluoride in a liquid state; pipes each connecting the sulfur hexafluoride decomposition chamber, the sulfur collection part, and the liquid hydrogen fluoride collection part to each other to distribute hydrogen fluoride or sulfur; a heating unit for maintaining temperatures of the sulfur collection part and the pipes to be equal to or higher than a condensation temperature of hydrogen fluoride; and a first collection line for collecting gas that is not condensed but remains in the liquid hydrogen fluoride collection part, the method comprising:
   a) filtering a mixed gas comprising sulfur hexafluoride and hydrogen through a filtering device to remove nitrogen gas and introducing the filtered mixed gas consisting of sulfur hexafluoride and hydrogen into the sulfur hexafluoride decomposition chamber;
   b) reacting sulfur hexafluoride and hydrogen by irradiating radiation to decompose and convert sulfur hexafluoride and hydrogen into sulfur and hydrogen fluoride;
   c1) discharging a mixture of hydrogen fluoride and sulfur formed in step b) from the sulfur hexafluoride decomposition chamber, and collecting the sulfur as solid powder from the mixture of hydrogen fluoride and sulfur in the sulfur collection part;
   c2) after step c1), discharging hydrogen fluoride from the sulfur collection part, and condensing hydrogen fluoride into a hydrogen fluoride liquid to obtain liquid hydrogen fluoride in the liquid hydrogen fluoride collection part; and
   d) collecting, in the first collection line, gas that is not condensed but remains in the liquid hydrogen fluoride collection part, and allowing the collected gas to be re-introduced into the sulfur hexafluoride decomposition chamber;
   wherein, in step c1), sulfur and hydrogen fluoride formed in step b) are introduced into the cyclone so that sulfur is collected as a solid powder by centrifugal force,
   wherein the cyclone which is the sulfur collection part and the pipes are maintained to be equal to or higher than the condensation temperature of the hydrogen fluoride by the heating unit so that the hydrogen fluoride is not condensed,
   wherein the pipe connecting the sulfur hexafluoride decomposition chamber and the sulfur collection part is inclined from the sulfur hexafluoride decomposition chamber to the sulfur collection part, and
   wherein the first collection line is connected onto an introduction path of the sulfur hexafluoride decomposition chamber.

2. The method of claim 1, wherein the radiation is an electron beam, gamma ray, or ion beam.

3. The method of claim 2, wherein a total radiation dose of the radiation is 50 to 500 KGy.

4. The method of claim 1, wherein an amount of hydrogen is 3 to 6 moles based on 1 mole of sulfur hexafluoride.

5. The method of claim 1, wherein sulfur hexafluoride is generated in a process or an apparatus using sulfur hexafluoride as an adiabatic gas or an insulating gas.

6. The method of claim 1, further comprising separating and collecting liquid hydrogen fluoride obtained in step c2).

7. A method for treating sulfur hexafluoride generated in heavy electric equipment using a treatment apparatus including: a sulfur hexafluoride decomposition chamber into which a filtered mixed gas consisting of sulfur hexafluoride and hydrogen is introduced; a radiation irradiation device irradiating radiation to the filtered mixed gas introduced into the sulfur hexafluoride decomposition chamber; a sulfur collection part which is a cyclone collecting sulfur using centrifugal force from a mixture of hydrogen fluoride and sulfur discharged from the sulfur hexafluoride decomposition chamber in which the sulfur hexafluoride and hydrogen are decomposed into hydrogen fluoride and sulfur by irradiating radiation; a fluoride salt collection part injecting hydrogen fluoride discharged from the sulfur collection part into an aqueous metal or non-metal ion solution to collect a fluoride salt formed by a reaction between the hydrogen fluoride and metal or non-metal ions, wherein the fluoride salt collection part comprises a bubbling device and a reaction vessel filled with the aqueous metal or non-metal ion solution, and wherein the bubbling device converts the hydrogen fluoride into micro-bubbles; pipes each connecting the sulfur hexafluoride decomposition chamber, the sulfur collection part, and the fluoride salt collection part to each other to distribute hydrogen fluoride or sulfur; a heating unit for maintaining temperatures of the sulfur collection part and the pipes to be equal to or higher than a condensation temperature of hydrogen fluoride; and a second collection line for collecting gas that is not dissolved in the aqueous metal or non-metal solution but remains in the fluoride salt collection part, the method comprising:

a) filtering a mixed gas comprising sulfur hexafluoride and hydrogen through a filtering device to remove nitrogen gas and introducing the filtered mixed gas consisting of sulfur hexafluoride and hydrogen into the sulfur hexafluoride decomposition chamber;

b) reacting sulfur hexafluoride and hydrogen by irradiating radiation to decompose and convert sulfur hexafluoride and hydrogen into sulfur and hydrogen fluoride;

c1) discharging a mixture of hydrogen fluoride and sulfur formed in step b) from the sulfur hexafluoride decomposition chamber, and collecting the sulfur as solid powder from the mixture of hydrogen fluoride and sulfur in the sulfur collection part;

c2) after step c1), discharging hydrogen fluoride from the sulfur collection part, and injecting hydrogen fluoride into the aqueous metal or non-metal ion solution contained in the fluoride salt collection part to form the fluoride salt, wherein the hydrogen fluoride is injected in the form of micro-bubbles; and d) collecting, in the second collection line, gas that is not dissolved in the aqueous metal or non-metal solution but remains in the fluoride salt collection part, and allowing the collected gas to be re-introduced into the sulfur hexafluoride decomposition chamber;

wherein, in step c1), sulfur and hydrogen fluoride formed in step b) are introduced into the cyclone so that sulfur is collected as a solid powder by centrifugal force, wherein the cyclone which is the sulfur collection part and the pipes are maintained to be equal to or higher than the condensation temperature of the hydrogen fluoride by the heating unit so that the hydrogen fluoride is not condensed, wherein the pipe connecting the sulfur hexafluoride decomposition chamber and the sulfur collection part is provided to be inclined from the sulfur hexafluoride decomposition chamber to the sulfur collection part, and wherein the second collection line is connected onto an introduction path of the sulfur hexafluoride decomposition chamber.

8. The method of claim 7, wherein an ion of the aqueous metal or non-metal ion solution is an ion of a Group IA element, a Group IIB element, a Group IIIA element, a Group IVA element, a Group VA element, a Group VIA element, a Group VIIA element, a Group VIIIA element, a Group IB element, a Group IIIB element, or a mixture thereof.

9. The method of claim 7, wherein the ion of the aqueous metal or non-metal ion is an ion of one or two or more selected from Li, K, Mg, Ca, Sc, Y, La, Ac, Ti, Zr, Hf, V, Nb, Cr, Mo, W, Mn, Fe, Co, Ni, Ru, Rh, Pd, Os, Ir, Pt, Cu, B, Al, Ga, and In.

10. The method of claim 7, wherein the radiation is an electron beam, gamma ray, or ion beam.

11. The method of claim 10, wherein a total radiation dose of the radiation is 50 to 500 KGy.

12. The method of claim 7, wherein an amount of hydrogen is 3 to 6 moles based on 1 mole of sulfur hexafluoride.

13. The method of claim 7, wherein sulfur hexafluoride is generated in a process or an apparatus using sulfur hexafluoride as an adiabatic gas or an insulating gas.

14. The method of claim 7, further comprising separating and collecting fluoride salt obtained in step c2).

* * * * *